US009566766B2

(12) United States Patent
Gerardin et al.

(10) Patent No.: US 9,566,766 B2
(45) Date of Patent: Feb. 14, 2017

(54) INSULATING MULTIPLE GLAZING INCLUDING TWO LOW-EMISSIVITY STACKS

(75) Inventors: Hadia Gerardin, Paris (FR); Vincent Reymond, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 648 days.

(21) Appl. No.: 14/007,207

(22) PCT Filed: Mar. 23, 2012

(86) PCT No.: PCT/FR2012/050613
§ 371 (c)(1),
(2), (4) Date: Sep. 24, 2013

(87) PCT Pub. No.: WO2012/131243
PCT Pub. Date: Oct. 4, 2012

(65) Prior Publication Data
US 2014/0010976 A1   Jan. 9, 2014

(30) Foreign Application Priority Data

Mar. 25, 2011   (FR) .................................... 11 52516

(51) Int. Cl.
*B32B 17/00* (2006.01)
*B32B 17/10* (2006.01)
(Continued)

(52) U.S. Cl.
CPC ... *B32B 17/10055* (2013.01); *B32B 17/10201* (2013.01); *B32B 17/10211* (2013.01);
(Continued)

(58) Field of Classification Search
CPC ............ E06B 3/66; E06B 3/6715; E06B 3/67; Y02B 80/22; Y02B 80/24
See application file for complete search history.

(56) References Cited

U.S. PATENT DOCUMENTS 5,520,996 A    5/1996  Balian et al.
6,974,629 B1   12/2005 Krisko et al.
(Continued)

FOREIGN PATENT DOCUMENTS

| DE | 90 14 083      | 2/1992 |
| JP | 2004 149400    | 5/2004 |
| WO | WO 2010/043828 | 4/2010 |

OTHER PUBLICATIONS

WO 2009/036284, Mar. 2009.*
(Continued)

*Primary Examiner* — Donald J Loney
(74) *Attorney, Agent, or Firm* — Oblon, McClelland, Maier & Neustadt, L.L.P.

(57) ABSTRACT

A multiple glazing unit with thermal isolation properties, obtained by associating at least two glass substrates, which substrates are separated by gas-filled cavities, the multiple glazing unit incorporating:
  a first low-E film multilayer including at least one functional metallic film; and
  a second low-E film multilayer including at least one functional film made of a transparent conductive oxide, and a film made essentially of silicon oxide deposited on the function film made of transparent conductive oxide.

19 Claims, 1 Drawing Sheet

(51) Int. Cl.
  *C03C 17/34* (2006.01)
  *C03C 17/36* (2006.01)
  *E06B 3/66* (2006.01)
  *E06B 3/67* (2006.01)

(52) U.S. Cl.
  CPC .. *B32B 17/10229* (2013.01); *B32B 17/10761* (2013.01); *C03C 17/3411* (2013.01); *C03C 17/36* (2013.01); *C03C 17/366* (2013.01); *C03C 17/3626* (2013.01); *C03C 17/3681* (2013.01); *C03C 2218/365* (2013.01); *E06B 3/66* (2013.01); *E06B 3/67* (2013.01); *E06B 3/6715* (2013.01); *Y02B 80/22* (2013.01); *Y02B 80/24* (2013.01)

(56) References Cited

U.S. PATENT DOCUMENTS

| | | | |
|---|---|---|---|
| 7,342,716 B2* | 3/2008 | Hartig | C03C 17/36 359/359 |
| 8,883,277 B2* | 11/2014 | Janssen | C03C 17/3435 428/34 |
| 2006/0090834 A1 | 5/2006 | Huang et al. | |
| 2006/0115655 A1 | 6/2006 | Krisko et al. | |
| 2008/0118678 A1 | 5/2008 | Huang et al. | |
| 2009/0075067 A1 | 3/2009 | Myli et al. | |
| 2009/0075069 A1 | 3/2009 | Myli et al. | |
| 2010/0326816 A1 | 12/2010 | Myli et al. | |
| 2010/0326817 A1 | 12/2010 | Myli et al. | |

OTHER PUBLICATIONS

WO 2010/043828, Apr. 2010.*

"Verglasungen mit Warmedammschicht auf der Aussenseite", In"Hans Joachim Glaser: Dunnfilmetchnologie auf Flachglas", Verlag Karl Hofmann, pp. 185-200, XP007919680, (1999).

International Search Report Issued Jul. 12, 2012 in PCT/FR12/050613 filed Mar. 23, 2012.

* cited by examiner

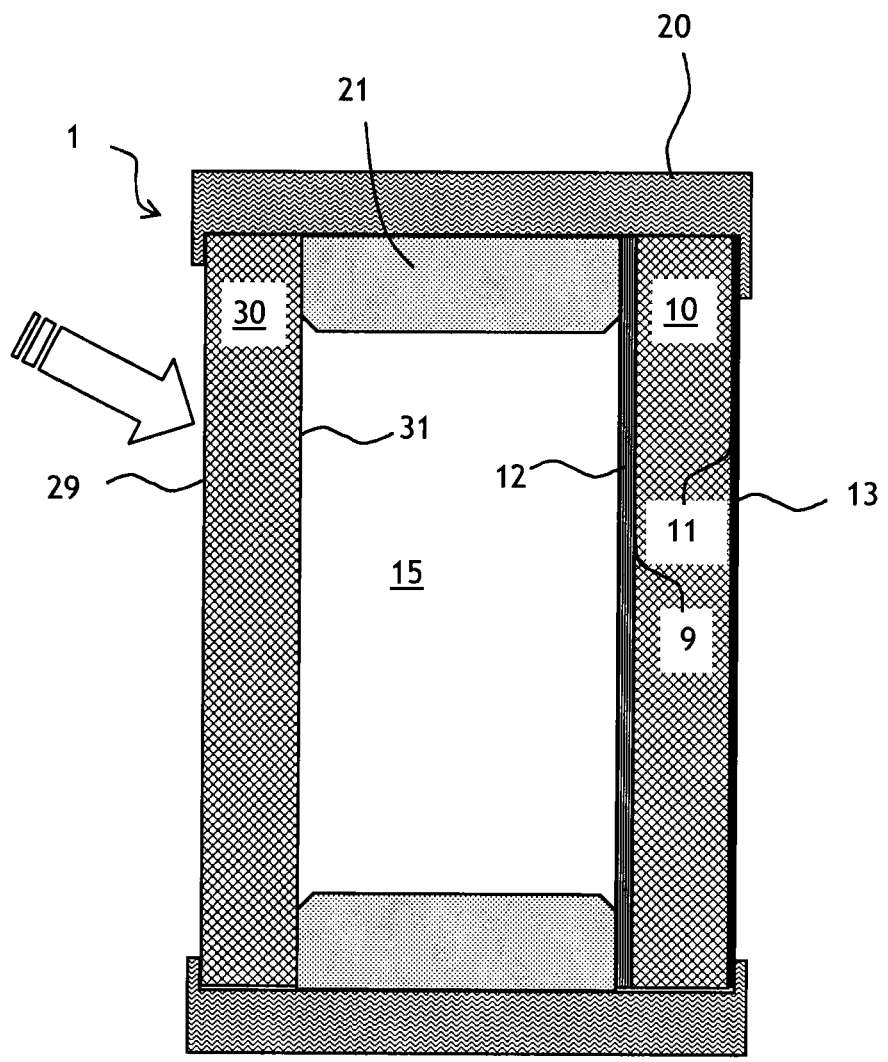

INSULATING MULTIPLE GLAZING INCLUDING TWO LOW-EMISSIVITY STACKS

CROSS REFERENCE TO RELATED APPLICATIONS

The present application is a 35 U.S.C. §371 national stage patent application of International patent application PCT/FR2012/050613, filed on Mar. 23, 2012, published as WO 2012/131243 on Oct. 4, 2012, the text of which is incorporated by reference, and claims the benefit of the filing date of French application no. 1152516, filed on Mar. 25, 2011, the text of which is also incorporated by reference.

The invention relates to multiple glazing units, in particular to double or triple glazing units for the architectural field, said glazing unit comprising a functional metallic film capable of acting on solar radiation and/or long-wavelength infrared radiation.

The invention more particularly relates to glazing units providing enhanced thermal insulation and having a high solar factor, and therefore mainly intended for cold climates.

The glazing units are more particularly intended to equip buildings especially with a view to reducing the energy required for heating in winter (what are called low-E glazing units) and to maximizing free solar heating.

In such glazing units, for example a double glazing unit, two glass substrates are kept a certain distance apart by spacers, so as to define a cavity that is filled with an insulating gas such as air, argon or krypton. A double glazing unit therefore consists of two glass sheets (substrates) separated by a gas-filled cavity. The sequence 4/12/4 thus denotes a double glazing unit consisting of two 4 mm-thick glass sheets and a 12 mm-thick gas-filled cavity.

BACKGROUND

Brief Description of the Drawing

FIG. 1 shows a schematic of an embodiment of a double glazing unit (DGU) 1 comprising two glass sheets, each forming a substrate 10, 30.

DETAILED DESCRIPTION

Conventionally, the faces of a double glazing unit are numbered starting from the exterior of a building. A double glazing unit thus comprises 4 faces, face 1 is on the outside of the building (and therefore forms the external wall of the glazing unit), face 4 is inside the building (and therefore forms the internal wall of the glazing unit), faces 2 and 3 being internal to the double glazing unit.

In the same way, a triple glazing unit comprises 6 faces, face 1 is on the outside of the building (external wall of the glazing unit), face 6 is inside the building (internal wall of the glazing unit) and faces 2 to 5 are internal to the triple glazing unit.

In a known way, double glazing units providing enhanced thermal insulation or insulating glazing units (often also called DGUs for double glazing units) comprise a film multilayer said to have low-E (low-emission) properties, said low-E film multilayer incorporating at least one functional metallic film capable of reflecting infrared and/or solar radiation, especially at least one functional metallic film based on silver or a metallic silver-containing alloy. This multilayer is conventionally deposited on face 2 or 3 of the double glazing unit.

In this type of multilayer, the functional film is most often located between two antireflection coatings each in general comprising a number of films that are each made of a dielectric material such as a nitride (and especially silicon or aluminum nitride) or oxide.

Examples of double glazing units equipped with such films are for example described in publications WO 2007/101964, EP 877 005, EP 718 250, FR 2 856 627, EP 847 965, EP 183 052 and EP 226 993.

Currently, such a film multilayer is deposited on one of the glass substrates of the double glazing unit, in a given reactor for depositing films by magnetron sputtering targets made of the material to be deposited or of a metal that is sputtered in a reactive atmosphere. Such a process is called a magnetron process in the deposition field.

The thermal insulation performance of these glazing units is conventionally given by the heat transfer coefficient U, which denotes the amount of heat passing through the glazing unit, between the two faces of the glazing unit, per unit area and per unit temperature difference. In an insulating double glazing unit it is therefore desirable to minimize heat transfer from the exterior to the interior, i.e. to minimize the U-factor.

The coefficient U is measured, according to the invention, under the conditions described in international standard ISO 10292.

Another parameter allowing the quality of a double glazing unit to be quantified is the solar factor SF. It is defined as the ratio of the energy entering a room via the glazing unit to the incident solar energy. It may be calculated by summing the energy flux directly transmitted through the glazing unit and the energy flux absorbed by the glazing unit and then reemitted toward the interior.

The coefficient SF is measured, according to the invention, under the conditions described in international standard ISO 9050.

In a known way, current insulating double glazing units most often comprise low-E film multilayers most often comprising at least one silver film on face 2 or most often on face 3 of the DGU, in order to limit radiative heat transfer. The presence of this low-E film also has the effect of reducing the solar factor, in particular if it is located on face 2 of the double glazing unit.

By way of example, the properties of a commercially available multilayer in use at the present time and incorporating a functional silver film, and the energy and optical performance metrics obtained for a 4/16(90% Ar)/4 double glazing unit comprising this multilayer on its face 2 or 3, are given in table 1 below.

TABLE 1

| DGU: 4/16(90% Ar)/4 | No low-E multilayer | (Ag) low-E on face 2 | (Ag) low-E on face 3 |
|---|---|---|---|
| U (W·m$^{-2}$·K$^{-1}$) | 2.6 | 1.1 | 1.1 |
| SF (%) | 78 | 58 | 63 |

| Low-E multilayer ||
|---|---|
| Film | Thickness (nm) |
| ZnSnSbO$_x$ | 2 |
| Si$_3$N$_4$ | 35 |
| ZnO | 5 |
| Ti | <1 |
| Ag | 11 |
| ZnO | 5 |
| TiO$_2$ | 12 |

TABLE 1-continued

| | |
|---|---|
| Si$_3$N$_4$ | 15 |
| Glass | |

Also known from the prior art are DGUs in which the low-E multilayer comprises a functional film that reflects infrared and/or solar radiation, which film is not a metallic film but a film made of a transparent conductive oxide (TCO), especially ITO (mixed indium tin oxide) or SnO$_2$:F (fluorine-doped tin oxide). The energy and optical performance metrics obtained for conventional DGUs with or without a multilayer incorporating a 320 nm-thick SnO$_2$:F (tin oxide) functional film doped with 1 at % fluorine, are given in table 2 below.

TABLE 2

| DGU: 4/16(90% Ar)/4 | No low-E | (TCO) low-E on face 2 | (TCO) low-E on face 3 | (TCO) low-E on face 4 |
|---|---|---|---|---|
| U (W · m$^{-2}$ · K$^{-1}$) | 2.6 | 1.5 | 1.5 | 2.1 |
| SF (%) | 78 | 70 | 77 | 73 |

It may be seen that when the functional film is made of a TCO, the energy transmission factor U is higher than is the case when a functional metallic film is used, because the functional films have a higher emissivity. It may also be seen that the solar factor is not greatly affected by the presence of such a TCO functional film, when the film is deposited on face 3.

Double glazing units comprising two multilayers on different faces of the glazing unit have also been provided, especially in application EP 637 572 A1. According to this publication, it is possible to further reduce the energy transmission factor and obtain DGUs with U=1.1 by placing a first low-E multilayer comprising a silver film placed on face 3 of the double glazing unit, the action of which is complimented by another low-E film of a different nature placed on face 4.

Although placing two low-E films on the glazing unit on two different faces effectively allows the energy transmission coefficient U to be advantageously decreased, work carried out by the Applicant has shown that it is also accompanied by a significant decrease in its measured solar factor.

OBJECT

The aim of the present invention is to solve the problems presented above by providing an insulating glazing unit having enhanced thermal insulation properties, in particular U values below 1.1 and even 1.0, while preserving a high solar factor.

More particularly, the present invention relates to a multiple glazing unit with thermal isolation properties, obtained by associating a plurality of glass substrates separated by gas-filled cavities, the front face of the first substrate defining the external wall of the glazing unit and the back face of the last substrate defining the internal wall of said glazing unit, said multiple glazing unit incorporating:
  a first low-E film multilayer comprising at least one functional metallic film; and
  a second low-E film multilayer comprising at least one functional film made of a transparent conductive oxide.

According to the invention, said second multilayer is deposited on the back face of the last substrate, forming the internal wall of the glazing unit, and said first multilayer is deposited on the other face of said last substrate or on the face of the preceding substrate facing said other face.

Furthermore, a film made essentially of silicon oxide is placed, in said second low-E film multilayer, relative to the surface of said last glass substrate, on the functional film made of transparent conductive oxide.

According to the invention, said second multilayer does not comprise a functional metallic film.

According to a first possible embodiment, the present invention relates to a double glazing unit with thermal isolation properties, obtained by associating two glass substrates separated by a gas-filled cavity, the first substrate defining faces 1 and 2 of the glazing unit, the second substrate defining faces 3 and 4 of the glazing unit, the unit incorporating:
  a first low-E film multilayer comprising at least one functional metallic film, said multilayer being deposited on face 2 or 3 of the double glazing unit; and
  a second low-E film multilayer comprising at least one functional film made of a transparent conductive oxide, said multilayer being deposited on the second substrate on face 4 of the double glazing unit,
in which a film made essentially of silicon oxide is placed, on face 4 and, relative to the surface of the second glass substrate, on the functional film made of transparent conductive oxide, in said second low-E film multilayer.

According to this embodiment, face 4 of the second substrate therefore forms the internal wall of the glazing unit, on which said second multilayer is deposited.

According to another embodiment, the present invention relates to a triple glazing unit with thermal insulation properties, obtained by associating three glass substrates separated by gas-filled cavities, the first substrate defining faces 1 and 2 of the glazing unit, the second substrate defining faces 3 and 4 of the glazing unit, said third substrate defining faces 5 and 6 of the glazing unit, incorporating:
  a first low-E film multilayer comprising at least one functional metallic film, said multilayer being deposited on face 4 or 5 of the triple glazing unit; and
  a second low-E film multilayer comprising at least one functional film made of a transparent conductive oxide, said multilayer being deposited on the second substrate on face 6 of the triple glazing unit,
in which a film made essentially of silicon oxide is placed, on face 6 and, relative to the surface of the second glass substrate, on the functional film made of transparent conductive oxide, in said third low-E film multilayer.

According to this embodiment, face 6 of the third substrate therefore forms the internal wall of the glazing unit, on which said second multilayer is deposited.

The expression "a film made essentially of silicon oxide" is understood, in the present description, to mean a film comprising oxygen and silicon and comprising more than 80 wt % silicon oxide based on the simple oxide formulation SiO$_2$, and optionally at least one other element, preferably chosen from the group consisting of Al, C, N, B, Sn, Zn and very preferably from Al, B or C.

Preferably said film made essentially of silicon oxide comprises more than 90 wt % silicon oxide according to the above definition, again based on the simple oxide formulation SiO$_2$. For the sake of simplicity, such a film is also called, in the present description, a silicon oxide film or a film of silicon oxide.

The expression "glass substrate" is understood, in the present invention, to mean a single glass sheet or an assembly of glass sheets, especially two glass sheets, joined together, to form what is called a laminated structure, by a polymer interlayer, especially a PVB (polyvinyl butyral) interlayer, using techniques well known in the field.

The term "multilayer" should be understood, in the present invention, to mean an assembly of at least two films superposed on the surface of a glass substrate.

The expression "low-E multilayer" is understood, in the present invention, to mean any multilayer known in the field to reduce the normal emissivity $\in_n$ from a glass wall equipped with said multilayer, in the sense described in: *Techniques de l'ingénieur, "Vitrage á isolation thermique renforcée"* ("Glazing unit with enhanced thermal isolation"), C3635.

In particular, the first low-E multilayer comprising at least one functional metallic film is advantageously chosen from multilayers resulting in a normal emissivity $\in_n$ of 0.1 or less, preferably of 0.08 or less and very advantageously of 0.05 or less.

The second low-E multilayer, comprising at least one functional film made of a transparent conductive oxide, is advantageously chosen from multilayers resulting in a normal emissivity $\in_n$ of 0.7 or less, preferably of 0.5 or less and very advantageously of 0.4 or less.

The expressions "making contact with", "makes contact with", etc. are understood, in the present invention, to mean that no intermediate film is interposed between the two films mentioned.

According to preferred embodiments of such multiple glazing units, which may of course be combined together, if required:

the film essentially comprising silicon oxide makes contact with the TCO film. Without however departing from the scope of the invention, an intermediate film may also be placed in said second multilayer between the TCO film and the film essentially comprising silicon oxide, this film for example being made of silicon nitride, aluminum nitride or of an alloy of these two materials;

the film made essentially of silicon oxide is the outermost film of the second low-E film multilayer;

the physical thickness of the film made essentially of silicon oxide is between 40 and 90 nm and preferably between 40 and 80 nm;

the metallic film is a silver film or a silver-based alloy film;

the transparent conductive oxide film is chosen from mixed indium tin oxide (ITO) in particular ITO with an $In_2O_3/SnO_2$ mass ratio of 90/10 or more, tin oxide doped with fluorine ($SnO_2$:F) or with antimony (Sb), aluminum-doped ZnO (AZO), gallium-doped ZnO (GZO), gallium and aluminum codoped ZnO (AGZO), and niobium-doped titanium oxide ($TiO_2$:Nb);

the physical thickness of the metallic film is between 6 and 16 nm and the thickness of the transparent conductive oxide is between 50 and 400 nm;

the physical thickness of the metallic film is between 6 and 10 nm and the thickness of the transparent conductive oxide is between 80 and 300 nm;

the physical thickness of the metallic film is between 10 and 12 nm and the thickness of the transparent conductive oxide is between 50 and 200 nm;

the physical thickness of the metallic film is between 12 and 16 nm and the thickness of the transparent conductive oxide is between 100 and 400 nm;

said second low-E film multilayer comprises, under the functional film made of transparent conductive oxide, at least one nitride-based dielectric film, especially made of silicon nitride and/or aluminum nitride;

the second low-E film multilayer includes the following films in succession, from the surface of the substrate: glass/silicon nitride/silicon oxide/ITO/optionally silicon nitride/silicon oxide, additional intermediate films possibly being inserted between these various films; and said second low-E film multilayer includes the following films in succession, from the surface of the substrate: glass/silicon oxide or oxycarbide/$SnO_2$:F/silicon oxide, additional intermediate films possibly being inserted between these various films.

The invention also relates to a substrate capable of being used to form the internal wall of a multiple glazing unit as described above, incorporating:

a first low-E film multilayer comprising at least one functional metallic film, said multilayer being deposited on a first face of said substrate; and a second low-E film multilayer comprising at least one functional film made of a transparent conductive oxide, said multilayer being deposited on the second face of said substrate, in which a film made essentially of silicon oxide is placed, in said second low-E film multilayer, and relative to the surface of the second glass substrate, on the functional film made of transparent conductive oxide.

Another subject of the present invention is also the use of a substrate such as described above in the manufacture of an insulating multiple glazing unit, said substrate forming the internal wall of said glazing unit.

Details and advantageous features of the invention will become clear from the following non-limiting examples, illustrated using FIG. 1 which shows a schematic of an embodiment of a double glazing unit (DGU) 1 comprising two glass sheets, each forming a substrate 10, 30. The two substrates are separated, held firmly in place and facing each other by spacers and frames 20, 21, the assembly bounding a closed space forming an intermediate gas-filled cavity 15. According to the invention, the gas may be air or argon or krypton (or a mixture of these gasses).

A first glass sheet (substrate 30) is turned toward the exterior, when the direction of incidence of solar light entering into the building, illustrated by the double arrow pointing, in the FIGURE, from left to right, is considered. In FIG. 1, this sheet is not coated, on its back face 31 turned toward the intermediate gas-filled cavity, with a coating. Its front side 29 (called "face 1"), which also forms the external wall of the glazing unit 1, may be bare or alternatively coated with another coating such as a self-cleaning coating, as described in publication EP 850 204, or such as an anticondensation coating, as described in publications WO 2007/115796 or WO 2009/106864.

The other glass sheet, located closest to the interior of the building, when the direction of incidence of solar light entering into the building is considered, forms the second substrate 10. This substrate 10 is coated, on its front side 9 turned toward the intermediate gas-filled cavity, by an insulating low-E coating consisting of a film multilayer 12 comprising at least one known silver-based (low-E) functional film (the silver-comprising low-E multilayer is thus located on an internal face "face 3" of the double glazing unit).

The back face 11 of the substrate 10, which also forms the internal wall of the glazing unit 1, is coated with another low-E thin-film multilayer 13, of the type described above, comprising at least one functional film made of a transparent conductive oxide.

In the FIGURE, the thicknesses of the various films are not shown to scale for the sake of legibility.

Without departing from the scope of the invention, the multilayer 12 could also be placed on face 2 of the double glazing unit 1.

The invention and its advantages will be better understood on reading the following non-limiting examples.

In all the following examples, the low-E thin-film multilayers were deposited on clear soda-lime glass sold by the Applicant company under the trade name Planilux®.

In all the following examples, in the double glazing units produced, the thin-film multilayers were respectively positioned on face 3 and face 4, i.e. on the glass substrate located closest to the interior of the building when the direction of incidence of solar light entering into the building is considered.

All the double glazing units (DGUs) produced according to the examples had the 4/16(90% Ar)/4 configuration, i.e. they consisted of two 4 mm-thick Planilux® transparent glass sheets separated by a 16 mm-thick intermediate cavity filled with 90% argon and 10% air, the assembly being held firmly in place by a frame 20 and spacers 21.

In all the examples, the low-E multilayer placed on face 3 of the DGU was that described above (table 1) as being representative of multilayers that are commercially available at the present time.

In accordance with the invention, the low-E multilayer placed on face 4 of the DGU was a low-E multilayer the functional film of which was made of a transparent conductive oxide TCO. In the examples, in order to demonstrate the advantages of implementing the present invention, the nature of the various films present in the multilayer was varied.

Except for multilayers comprising fluorine-doped $SnO_2$ as a functional film, all the films of the two multilayers can be deposited in a known conventional way by magnetron sputtering targets, in a vacuum.

Table 3 below collates the general conditions of the magnetron sputtering process used to deposit the various films of examples 1 to 3.

TABLE 3

| Film | Target employed | Deposition pressure (mbar) | Gas |
|---|---|---|---|
| $Si_3N_4$ | Si:Al by 92:8 wt % | $1.5 \times 10^{-3}$ | $Ar/(Ar + N_2)$ of 45% |
| $TiO_2$ | $TiO_x$ where x is about 1.9 | $1.5 \times 10^{-3}$ | $Ar/(Ar + O_2)$ of 95% |
| $SnZnSbO_x$ | SnZn:Sb by 34:65:1 wt % | $2 \times 10^{-3}$ | $Ar/(Ar + O_2)$ of 58% |
| ZnO | Zn:Al by 98:2 wt % | $2 \times 10^{-3}$ | $Ar/(Ar + O_2)$ of 52% |
| Ti | Ti metal | $2 \times 10^{-3}$ | 100% Ar |
| Ag | Ag | $4 \times 10^{-3}$ | 100% Ar |
| $SiO_2$ | Si:Al by 92:8 wt % | $2 \times 10^{-3}$ | $Ar/(Ar + O_2)$ of 70% |
| ITO | $In_2O_3/SnO_2$ (90/10 by weight) | $2 \times 10^{-3}$ | $Ar/(Ar + O_2)$ of 95% |

The mixed indium tin oxide (ITO) had an $In_2O_3/SnO_2$ mass ratio substantially equal to 90/10.

The films of $SnO_2$:F and the films of SiOC and $SiO_2$ of examples 4 to 9 were obtained by conventional CVD techniques. The fluorine dopant content was about 1 at %.

Examples 1 to 3 are examples of comparative multilayers according to the invention in which the TCO of the multilayer on face 4 of the double glazing unit was indium tin oxide ITO.

Examples 4 to 9 are examples of comparative multilayers according to the invention in which the TCO of the multilayer on face 4 of the double glazing was made of $SnO_2$:F.

Example 10 is an example of a comparative multilayer in which the final silicon oxide film was only 12 nanometers thick and therefore outside of the scope of the invention.

Example 1 (Comparative Example)

In this example, the multilayer on face 4 of the DGU was:

| Glass/ | $Si_3N_4$/ | ITO/ | $Si_3N_4$ |
|---|---|---|---|
| Thickness (nm) | 20 | 70 | 20 |

Example 2 (According to the Invention)

In this example, the multilayer on face 4 of the DGU was:

| Glass/ | $Si_3N_4$/ | ITO/ | $SiO_2$ |
|---|---|---|---|
| Thickness (nm) | 20 | 70 | 75 |

Example 3 (According to the Invention)

In this example, the multilayer on face 4 of the DGU was:

| Glass/ | $Si_3N_4$/ | $SiO_2$ | ITO/ | $SiO_2$ |
|---|---|---|---|---|
| Thickness (nm) | 20 | 15 | 70 | 75 |

Table 4 below gives the results obtained for the glazing units of examples 1 to 3.

TABLE 4

| Example | Solar Factor (%) | U factor $(W \cdot m^{-2} \cdot K^{-1})$ |
|---|---|---|
| 1 | 60.9 | 1.0 |
| 2 | 63.0 | 1.0 |
| 3 | 63.2 | 1.0 |

Examples 4 to 6 (Comparative Examples)

In these examples, the multilayer on face 4 of the DGU was:

| Example | Glass/ | SiOC/ | $SnO_2$:F |
|---|---|---|---|
| 4 | Thickness (nm) | 30 | 320 |
| 5 | | 30 | 260 |
| 6 | | 30 | 160 |

Examples 7 to 9 (According to the Invention)

In these examples, the multilayer on face 4 of the DGU was:

| Example | Glass/ | SiOC/ | SnO$_2$:F/ | SiO$_2$ |
|---|---|---|---|---|
| 7 | Thickness (nm) | 30 | 320 | 80 |
| 8 | | 30 | 260 | 80 |
| 9 | | 30 | 160 | 80 |

Table 5 below gives the results obtained for the double glazing units of examples 4 to 9.

TABLE 5

| Example | Solar Factor (%) | U factor (W · m$^{-2}$ · K$^{-1}$) |
|---|---|---|
| 4 | 59.4 | 1.0 |
| 5 | 59.6 | 1.0 |
| 6 | 60.3 | 1.0 |
| 7 | 61.8 | 1.0 |
| 8 | 62.1 | 1.0 |
| 9 | 62.6 | 1.0 |

The results presented in tables 4 and 5 show that the double glazing units equipped with two low-E multilayers according to the invention had a better overall performance with respect to heat transfer coefficient U and solar factor.

Example 10 (Comparative Example)

In this example, the multilayer on face 4 of the DGU was:

| Glass/ | Si$_3$N$_4$/ | ITO/ | SiO$_2$ |
|---|---|---|---|
| Thickness (nm) | 20 | 70 | 12 |

For this comparative example a solar factor of 59.6% and a U factor of 1.0 W·m$^{-2}$·K$^{-1}$ were measured.

It may be seen, by comparing examples 1 to 10 above, that glazing units according to the invention have higher solar factors for a given heat transfer coefficient.

The present invention is described above by way of example. It should be understood that a person skilled in the art will be able to produce a range of variants of the invention without however departing from the scope of the present invention. In particular, the present invention may be applied to triple glazing units.

The invention claimed is:

1. A multiple glazing unit obtained by associating a plurality of glass substrates separated by gas-filled cavities, a front face of a first glass substrate defining an external wall of the multiple glazing unit and a back face of a last glass substrate defining an internal wall of the multiple glazing unit,
wherein the multiple glazing unit comprises:
a first low-E film multilayer comprising at least one functional metallic film; and
a second low-E film multilayer comprising at least one functional film comprising a transparent conductive oxide,
wherein the second low-E film multilayer is deposited on the back face of the last glass substrate, forming the internal wall of the glazing unit,
wherein the first low-E film multilayer is deposited on the other face of the last glass substrate or on the face of a preceding glass substrate facing the other face, and
wherein a film essentially of silicon oxide and having a physical thickness from 40 to 90 nm is placed, in the second low-E film multilayer and, relative to the surface of the last glass substrate, on the functional film comprising the transparent conductive oxide.

2. The multiple glazing unit of claim 1, which is a double glazing unit obtained by associating two glass substrates separated by a gas-filled cavity, the first substrate defining faces 1 and 2 of the double glazing unit, the second substrate defining faces 3 and 4 of the double glazing unit, face 1 defining the external wall and face 4 defining the internal wall, wherein the double glazing unit comprises:
the first low-E film multilayer comprising the at least one functional metallic film, wherein the first low-E film multilayer is deposited on face 2 or 3 of the double glazing unit; and
the second low-E film multilayer comprising the at least one functional film comprising a transparent conductive oxide, wherein the second low-E film multilayer is deposited on the second substrate on face 4 of the double glazing unit,
wherein the film made essentially of silicon oxide is placed, on face 4 and, relative to the surface of the second glass substrate, on the functional film comprising the transparent conductive oxide, in the second low-E film multilayer.

3. The multiple glazing unit of claim 1, which is a triple glazing unit obtained by associating three glass substrates separated by gas-filled cavities, the first glass substrate defining faces 1 and 2 of the triple glazing unit, the second glass substrate defining faces 3 and 4 of the triple glazing unit, the third glass substrate defining faces 5 and 6 of the glazing unit, face 1 defining the external wall and face 6 defining the internal wall, wherein the triple glazing unit comprises:
the first low-E film multilayer comprising at least one functional metallic film, wherein the first low-E film multilayer is deposited on face 4 or 5 of the triple glazing unit; and
the second low-E film multilayer comprising at least one functional film comprising a transparent conductive oxide, wherein the second low-E film multilayer is deposited on the second glass substrate on face 6 of the triple glazing unit,
wherein the film made essentially of silicon oxide is placed, on face 6 and, relative to the surface of the third glass substrate, on the functional film comprising the transparent conductive oxide, in the second low-E film multilayer.

4. The multiple glazing unit of claim 1, wherein the film made essentially of silicon oxide contacts the transparent conductive oxide film of the second low-E film multilayer.

5. The multiple glazing unit of claim 1, wherein the film made essentially of silicon oxide is the outermost film of the second low-E film multilayer.

6. The multiple glazing unit of claim 1, wherein the metallic film is a silver film or a silver alloy film.

7. The multiple glazing unit of claim 1, wherein the transparent conductive oxide film is selected from the group consisting of a mixed indium tin oxide (ITO, a tin oxide doped with fluorine (SnO$_2$:F), a tin oxide doped with antimony (Sb), aluminum-doped ZnO (AZO), gallium-doped ZnO (GZO), gallium and aluminum codoped ZnO (AGZO), and niobium-doped titanium oxide (TiO$_2$:Nb).

8. The multiple glazing unit of claim 1, wherein the physical thickness of the metallic film is from 6 to 16 nm and wherein the thickness of the transparent conductive oxide film is from 50 to 400 nm.

9. The multiple glazing unit of claim 8, wherein the physical thickness of the metallic film is from 6 to 10 nm and wherein the thickness of the transparent conductive oxide film is from 80 to 300 nm.

10. The multiple glazing unit of claim 8, wherein the physical thickness of the metallic film is from 10 to 12 nm and wherein the thickness of the transparent conductive oxide film is from 50 to 200 nm.

11. The multiple glazing unit of claim 8, wherein the physical thickness of the metallic film is from 12 to 16 nm and wherein the thickness of the transparent conductive oxide is from 100 to 400 nm.

12. The multiple glazing unit of claim 1, wherein the second low-E film multilayer comprises, under the functional film comprising the transparent conductive oxide, at least one nitride dielectric film.

13. The multiple glazing unit of claim 1, wherein the second low-E film multilayer comprises the following films in succession, from the surface of the glass substrate: glass/silicon nitride/silicon oxide/ITO/optionally silicon nitride/silicon oxide, and optionally comprises additional intermediate films inserted between these various films.

14. The multiple glazing unit of claim 1, wherein the second low-E film multilayer comprises the following films in succession, from the surface of the glass substrate: glass/silicon oxide or oxycarbide/$SnO_2$:F/silicon oxide, and optionally comprises additional intermediate films inserted between these various films.

15. The multiple glazing unit of claim 1, wherein the film made essentially of silicon oxide has a physical thickness from 40 to 80 nm.

16. The multiple glazing unit of claim 7, wherein the transparent conductive oxide is a mixed indium tin oxide having an $In_2O_3/SnO_2$ mass ratio of 90/10 or more.

17. The multiple glazing unit of claim 12, wherein the nitride dielectric film is silicon nitride, aluminum nitride, or a mixture thereof.

18. The multiple glazing unit of claim 2, wherein the film made essentially of silicon oxide is the outermost film of the second low-E film multilayer.

19. The multiple glazing unit of claim 3, wherein the film made essentially of silicon oxide is the outermost film of the second low-E film multilayer.

* * * * *